United States Patent [19]
Walloch et al.

[11] Patent Number: 5,460,648
[45] Date of Patent: Oct. 24, 1995

[54] MASONRY ADMIXTURE AND METHOD OF PREPARING SAME

[75] Inventors: Craig T. Walloch, Arlington, Mass.;
Cynthia L. Ebner, New Market, Md.;
David Chin, Charlestown, Mass.;
Bahram Siadat, Boca Raton, Fla.;
Chia-Chih Ou, Lexington, Mass.

[73] Assignee: W. R. Grace & Co.-Conn., New York, N.Y.

[21] Appl. No.: 228,473

[22] Filed: Apr. 15, 1994

[51] Int. Cl.⁶ ..................................................... C08L 91/00
[52] U.S. Cl. .......................... 106/215; 106/218; 106/219; 106/243; 106/661; 106/823
[58] Field of Search .................................. 106/661, 130, 106/131, 142, 162, 171, 210, 211, 215, 243, 823, 665, 666, 218, 219

[56] References Cited

U.S. PATENT DOCUMENTS

| | | |
|---|---|---|
| 3,645,763 | 2/1972 | Ronzio et al. |
| 3,865,601 | 2/1975 | Serafin et al. |
| 3,885,985 | 5/1975 | Serafin et al. |
| 4,375,987 | 3/1983 | Lange et al. |
| 4,986,854 | 1/1991 | Okuno ................................. 106/665 |
| 5,108,511 | 4/1992 | Wiegland ............................ 106/728 |
| 5,294,256 | 3/1994 | Weigand et al. .................... 106/819 |

*Primary Examiner*—Mark L. Bell
*Assistant Examiner*—Michael Marcheschi
*Attorney, Agent, or Firm*—Craig K. Leon; William L. Baker

[57] ABSTRACT

An additive is provided that comprises a single blend of an acid component and calcium stearate for simultaneously controlling both primary and secondary efflorescence in concrete, and particularly in concrete masonry units such as pavers. A preferred method comprises the steps of partially saponifying tall oil fatty acid with calcium hydroxide, and thereafter adding calcium stearate dispersion to form a stable emulsion blend. In another embodiment, potassium hydroxide is mixed with calcium stearate dispersion, then subsequently introduced into tall oil fatty acid to provide a non-emulsion TOFA/CSD blend.

19 Claims, 5 Drawing Sheets

MASONRY ADMIXTURE AND METHOD OF PREPARING SAME

FIELD OF THE INVENTION

The present invention relates to an additive and method for simultaneously controlling primary and secondary efflorescence in hydraulic cements, concretes, and mortars; and more particularly to the use of a stable mixture comprising tall oil fatty acid and calcium stearate, and to a method for preparing the same.

BACKGROUND OF THE INVENTION

This invention relates to additive compositions, otherwise known as admixtures, for incorporation into hydraulic cement mixes, for example, hydraulic cement concretes, mortars, grouts, neat cement mixes, etc. More particularly, it relates to nonplastic cement or concrete mixes.

Nonplastic cement or concrete mixes usually contain a relatively low water content per unit volume, and are used for making "concrete masonry units" (CMUs) which include concrete blocks, concrete pavers (e.g., blocks, tiles, or other shapes used for sidewalks and pavement), and components for segmental retaining walls. Nonplastic cement or concrete mixes are also used in concrete pipes, roof tiles and pavers, and other concrete articles. Nonplastic mixes usually contain portland cement, aggregates, water, and optionally pozzolanic additions. Nonplastic mixes differ significantly from "plastic" mixes which are more workable due to a higher content of water and which normally set and harden under ambient conditions.

In contrast to plastic mixes, nonplastic mixes may be mechanically forced into molds (or extruders), and may be cured under the influence of steam and elevated temperatures. Nonplastic mixes tend to have little if any slump after being molded or otherwise formed, and have sufficient physical integrity to retain a shape without the aid of the mold or form. The resulting products, which can be cured outside the mold or form, are often called no slump or low slump concrete products.

One of the common problems of concrete products, particularly for nonplastic concrete masonry units (CMUs) such as concrete masonry blocks pavers, is the phenomenon known as "efflorescence." Efflorescence is a crystalline deposit, usually whitish in color, which appears on the surface of the CMUs and diminishes their aesthetic value. As water moves through a CMU, it picks up dissolving salts such as, for example, calcium hydroxide. As water reaches the surface of the CMU, it evaporates, leaving the salt deposit on the surface. The calcium hydroxide left on the surface reacts with carbon dioxide in the air to form calcium carbonate. In addition to calcium carbonate, the deposits may consist also of sulfates of sodium, potassium, or calcium, in addition to calcium carbonate. In extreme cases, this white rocklike deposit material may build up a surface layer inches thick.

In addition to the aesthetic problem caused by the migration of salts to the surface of the CMUs, the leaching of the materials from the interior of the CMU may create or widen a crack formation, thereby increasing the penetration of water through the crack.

Efflorescence can be designated as being "primary" or "secondary" depending upon the source of water. "Primary efflorescence" occurs during initial setting of the concrete, usually within the first 24 hours. In this case, the water source is internal. The water contained in the original concrete mix dissolves calcium hydroxide formed during the hydration of portland cement. This salt solution then migrates (ie. leaches) to the surface, where the water evaporates, and the calcium hydroxide is deposited on the surface, giving rise to primary efflorescence. The calcium hydroxide, as previously explained, can further react with carbon dioxide from the air to form the less soluble salt, calcium carbonate. Primary efflorescence is often visibly manifested as a relatively uniform haze on the surface.

Secondary efflorescence, on the other hand, is related to moisture movement within the CMU after the concrete is set and hardened. In this case, the water usually originates from outside of the CMU, is absorbed into the CMU, and therein dissolves residual calcium hydroxide which then leaches out and is deposited on the surface when the water evaporates. Again, the leached calcium hydroxide deposited at the surface may further react with carbon dioxide from the atmosphere to form calcium carbonate. Secondary efflorescence is often visibly manifested as uneven whitish streaks on the surface of the CMU, or as uniformly distributed "new building bloom." This often occurs after the CMUs are installed in place.

Admixtures are known for controlling efflorescence in CMUs. However, two different types of admixtures are required for controlling primary and secondary efflorescence.

For controlling primary efflorescence, formulations containing liquid fatty acid mixtures (e.g., oleic acid and linoleic acid) have been commonly used. The oily liquid admixture is introduced into the batch mix at an early stage by coating onto the sand particles prior to the introduction of any mix water, so that the oily admixture is distributed uniformly throughout the concrete batch mix.

For controlling secondary efflorescence, admixtures containing aqueous-based calcium stearate dispersion (CSD) are often added at a later stage of the batching process with the mix water. In a typical batching process, sand is first charged into the mixer, then the oil-based primary anti-efflorescence admixture is added with constant mixing to allow the oil to coat the sand. Then coarse aggregates, colorants, and cement are added, followed by water. If CSD is used, it is then introduced usually at this point during or after the addition of the mix water. CSD is an aqueous dispersion wherein fine solid particles of calcium stearate are suspended in the water uniformly. Commercially available CSD has an average particle size of about 1 to 10 microns. The uniform distribution of CSD in the mix may render the resulting CMU water repellent, as CSD particles are well distributed in the pores of the unit to interfere with the capillary movement of water.

However, the fatty acid mixture and the calcium stearate dispersion (CSD), as is well-known to those of skill in the art, are incompatible. Introducing these mutually antagonistic admixtures at different stages of the concrete batch mixing process creates the ever-present risk that one or the other of these admixtures may be non-uniformly distributed within the batch mix; this situation in turn gives rise to the possibility that the surface of the resultant CMU may be mottled by primary or secondary efflorescence.

To control primary and secondary efflorescence, two separate feed streams of the liquid fatty acid and CSD are required for adding the respective anti-efflorescent admixtures, at two different stages, and in a particular sequence. This method of addition causes inconvenience, decreases flexibility of processing, and increases manufacturing costs, since the process requires two different sets of dispensers and inventories.

In surmounting the foregoing and other disadvantages of the prior art, the present invention provides an admixture and methods for making and using the same, wherein both the fatty acid and CSD are pre-combined into a single product which is simultaneously effective for minimizing or avoiding both primary and secondary efflorescence.

SUMMARY OF THE INVENTION

The present invention relates to additives which, when incorporated into concrete, and particularly into concrete masonry units (CMUs), provides simultaneous control over primary and secondary efflorescence. Exemplary additives comprise a water-repelling acid component selected from the group consisting of fatty acids, rosin acids, and mixtures thereof, and an aqueous calcium stearate dispersion (CSD).

An objective of the invention is to provide a method for making a stable mixture that contains both an acid component and CSD which are simultaneously operative, when introduced simultaneously as a pre-mixed blend into concrete (e.g., cement, concrete, masonry etc.) to control primary and secondary efflorescence. Thus, an exemplary composition comprises a single stable admixture blend having an acid component, such as tall oil fatty acid, and calcium stearate An exemplary method of the invention comprises the steps of preparing a partially calcium saponified acid component; converting the partially saponified acid into an oil-in-water emulsion by incorporating water and an emulsifier to obtain an emulsion; and combining both the saponified emulsion and CSD into a single blend.

Another exemplary method of the invention comprises the steps of combining an acid component, potassium hydroxide, and CSD into a single blend. In further embodiments, potassium hydroxide and the CSD are mixed together prior to being added to the TOFA to form a stable blend which is not an emulsion.

The invention is thus also directed to compositions obtained through the exemplary methods above.

A CSD/acid blend made from either of the two exemplary methods above may serve as a "base stock" which further comprises one or more additional additives for further modifying a variety of properties in concrete masonry products. Thus, other exemplary blends of the invention may comprise, in addition to the simultaneous presence of the fatty acid and CSD, a set retarding agent, an additional surfactant, water reducer, air entraining agent, and/or accelerator.

Exemplary methods for preventing efflorescence in CMUs thus comprise the step of introducing into the concrete, mortar, grout, or cement mix the above-described CSD/acid blend. Further features and advantages of the invention are disclosed hereinafter.

DETAILED DESCRIPTION OF PREFERRED EMBODIMENTS

Figure 1B:
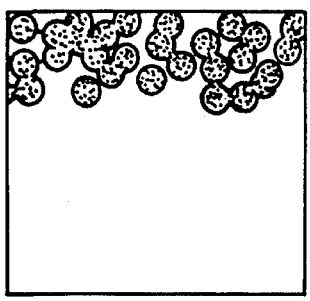
FIGS. 1(a) through 1(g) are pictorial representations of various emulsion concepts useful for understanding the present invention.
Figure 1C:
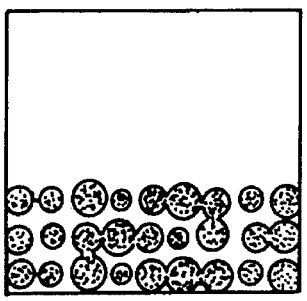
Figure 1D:
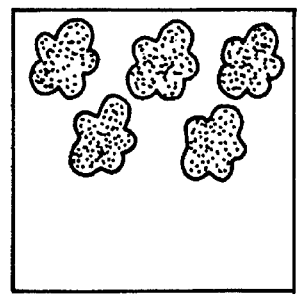

As used herein, the term "stable admixture" refers to an admixture with good stability, namely a shelf life of at least three months. With normal storage, the admixture should not undergo any significant changes in physical properties, such as color, appearance, and viscosity. Each ingredient of the admixture should not interact during storage prior to use, and each ingredient should retain its intended function when the admixture is put to use.

The term "concrete" as used herein shall generally refer to and include cement, concrete, and mortar.

The admixture composition of the present invention comprises at least one water repelling acid, and a calcium stearate dispersion (CSD) as the common ingredients. The water-repelling acid component may comprise, for example, known tall oil fatty acids, such as are described in U.S. Pat. Nos. 3,865,601 and 3,885,985, incorporated by reference herein. This acid component may comprise a water-insoluble fatty acid, rosin acid, or mixture thereof, such as is found in tall oil (tall oil fatty acid is hereinafter referred to as "TOFA").

An aqueous calcium stearate dispersion (CSD) may be formed using conventional known methods, such as described for example in U.S. Pat. No. 5,108,511 issued Apr. 28, 1992, to Weigland et al., incorporated herein by reference. See. e.g, Col. 3, lines 65 and following. The process involves heating commercial grade stearic acid/palmitic acid and lime powder. A particularly preferred CSD is commercially available from W. R. Grace & Co.-Conn, Cambridge, Mass., under the tradename DARAPEL®.

Commercial grade stearic/palmitic acid (available from Henkel Co., Emery Group, Cincinnati, Ohio) is usually a mixture of primarily stearic and palmitic acids with minor amounts of myristic acid, and other fatty acids as impurities. When reacted with lime (calcium hydroxide), these components become insoluble salts present as solid particles which can be dispersed in water. The term "CSD" as used herein refers to a dispersion of calcium stearate, calcium palmitate, calcium myristate, and combinations thereof. These components are solids dispersed in water (e.g., See FIG. 2a).

TOFA (Tall Oil Fatty Acid) is a water-insoluble oil, while CSD is an aqueous-based dispersion. It is generally well known that these are incompatible due to their mutual immiscibility. Two methods have been attempted to overcome their incompatibility. The first method involves converting TOFA into a TOFA oil-in-water emulsion, as described in U.S. Pat. No. 3,865,601. Then the TOFA emulsion is mixed together with the CSD. Unfortunately, the blend is not stable, and renders the blend useless as an anti-efflorescent admixture. Upon standing, the blend rapidly increases in viscosity; and the blend becomes a thick cream or solid mass.

In some cases, the blend also separates into two or more layers, with or without significant change in viscosity. The physical transformation may take hours or days depending upon the TOFA/CSD ratio, order of addition, or solids content.

Figure 1A:
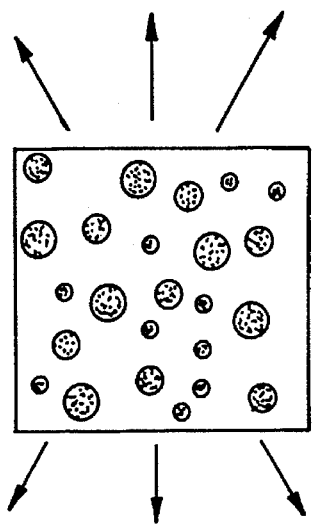
Figure 1E:
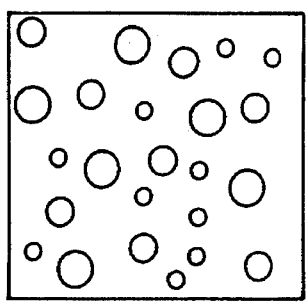
Figure 1F:
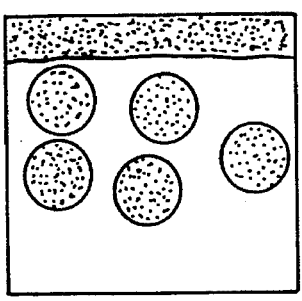
Figure 1G:
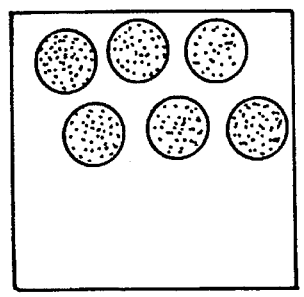

A stabilized TOFA emulsion consists of fine TOFA oil droplets dispersed uniformly in water as shown in the representational illustration of FIG. 1(a). The use of an emulsifier helps stabilize the emulsion. The stability of an emulsion can depend on the particle size, particle size distribution of the emulsion, and the amount and the choice of emulsifier used. A stabilized emulsion, once made, may undergo several different paths which eventually lead to the breakdown of the emulsion. These destabilizing mechanisms, as described in the literature (e.g., Tadros, T. F., *Advances in Colloid and Interface Science*, 46 (1993) 1–47, are illustrated in FIGS. 1(b) through 1(g). The mechanisms include creaming (FIG. 1(b)), sedimentation (FIG. 1(c)), flocculation (FIG. 1(e)), coalescence (FIG. 1(f)), and so-called Ostwald ripening (FIG. 1(g)).

The addition of a CSD dispersion to a TOFA emulsion, which leads to an unstable blend, can be caused by any, or a combination, of the destabilization mechanisms shown in FIGS. 1(b)–1(g).

Calcium stearate has a melting point of 180° C. Therefore, CSD, in fact, is an aqueous suspension of solid particles of calcium stearate. In the literature, the term "suspension" is often used interchangeably with the term "dispersion", particularly when the particles are small (e.g., dimensions less than several microns). The various states of suspension (or dispersion) can take a stable or unstable configuration, as shown in FIGS. 2(a) through 2(i) (taken from the aforementioned reference).

Figure 2A:
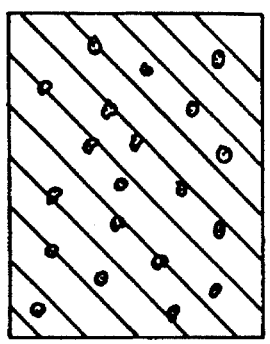
FIGS. 2(a) through 2(i) are pictorial representations of various aqueous suspension (dispersion) concepts useful for understanding the present invention.
Figure 2B:
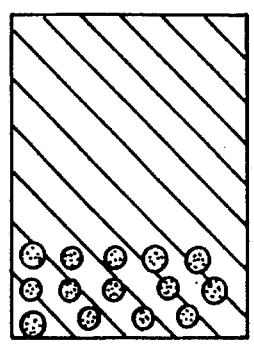
Figure 2C:
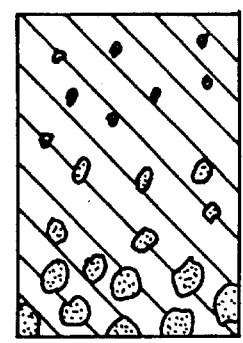
Figure 2D:
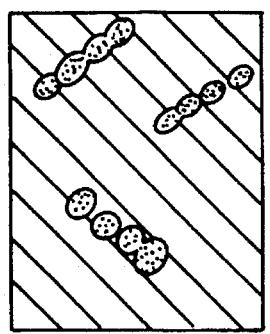
Figure 2E:
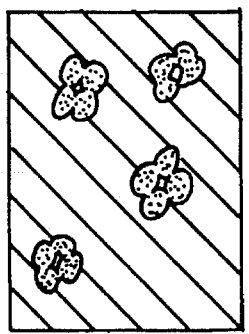
Figure 2F:
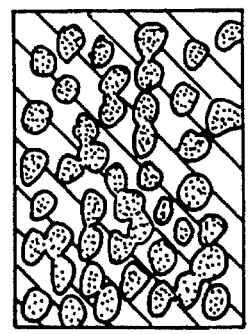
Figure 2G:
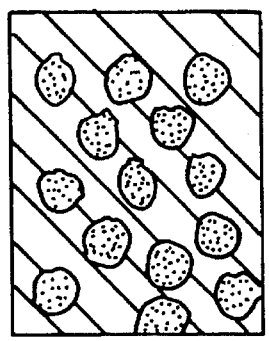
Figure 2H:
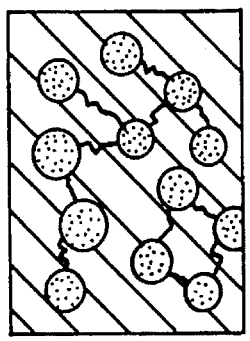
Figure 2I:
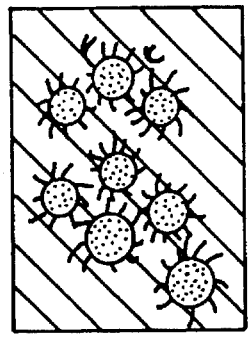

FIGS. 2(a), 2(b), and 2(c), respectively, diagrammatically illustrate a stable colloidal suspension, a stable coarse suspension of uniform size, and a stable coarse suspension in which particles have a nonuniform size distribution. The stable suspension may undergo coagulation or flocculation, which leads to various unstable states, as shown in FIGS. 2(d) through 2(i). Both coagulation and flocculation may be caused by the addition of electrolytes or polymers. For example, CSD can be flocculated by adding acids or salts.

Figure 3:
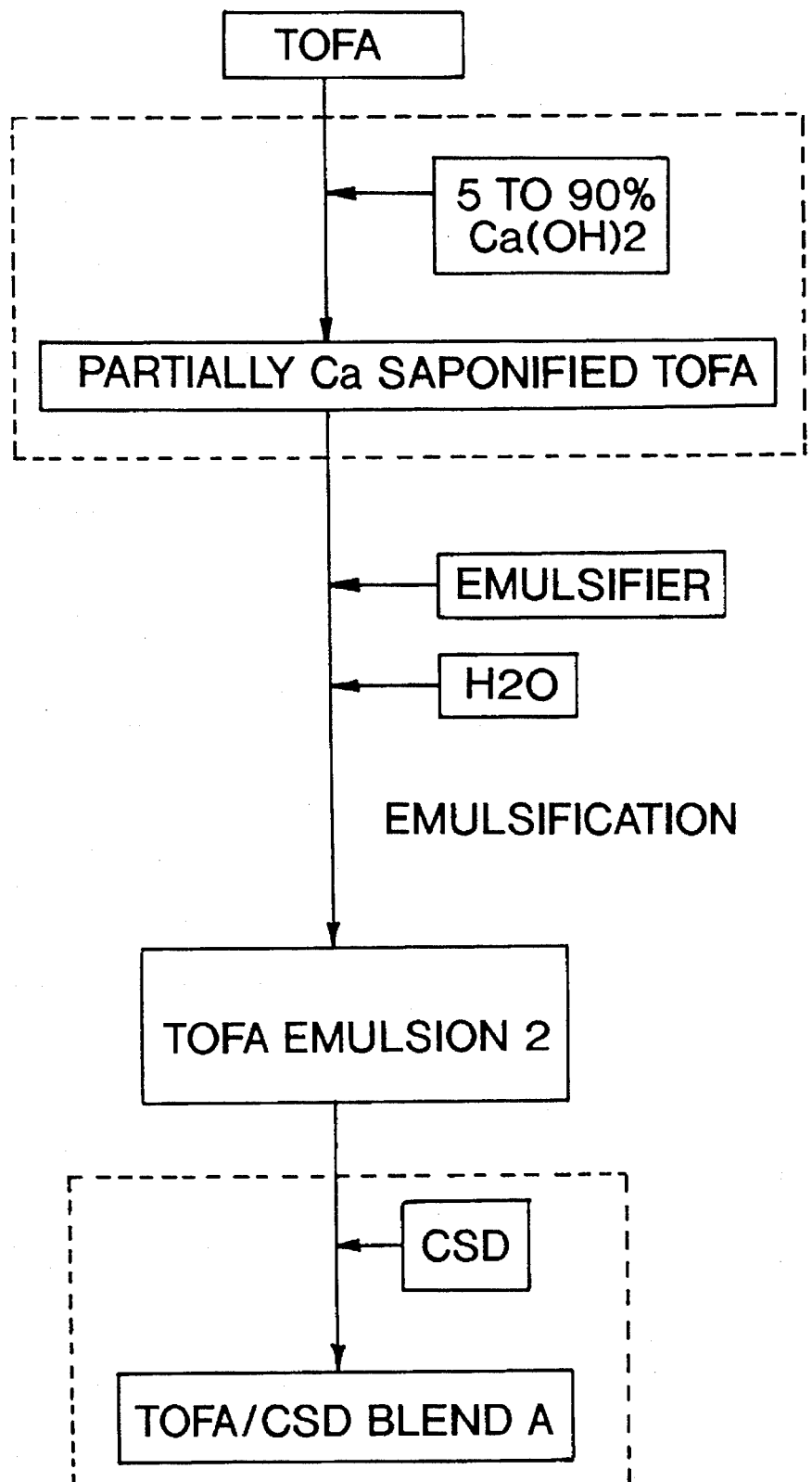
FIG. 3 is an illustration of an exemplary method of the invention for making a stable emulsion comprising a tall oil fatty acid (TOFA) and a calcium stearate dispersion (CSD)

During the course of researching CSD and TOFA, the present inventors unexpectedly found two methods for achieving stable blends. The first method, as shown in FIG. 3, involves the addition of $Ca(OH)_2$, also referred to as lime or hydrated lime (calcium hydroxide), to the TOFA to partially saponify the TOFA, prior to the making of an emulsion. The addition of an emulsifier and water to the partially calcium saponified TOFA provides the TOFA emulsion (shown as "TOFA EMULSION 2" in FIG. 3). The resulting emulsion, when blended with the CSD, demonstrates excellent stability (See "TOFA/CSD BLEND A" of FIG. 3). This is, indeed, a surprising discovery. During the early stage of problem solving, an attempt was made to find out why the CSD/TOFA emulsion was unstable. It was thought that residual lime (used to form CSD) slowly neutralized the TOFA, and hence that the lime reacted with the TOFA to form a Ca-TOFA salt which would lead to the solidification of the blend. Instead, the inventors surprisingly discovered that the addition of lime to the TOFA to form an emulsion, before the addition thereto of CSD, increased the stability of the resultant blend.

The use of the calcium hydroxide was further surprising because it was previously thought that the stability of a suspension such as CSD would decrease with the presence of an increasing amount of electrolyte such as $Ca^{2+}$. Since it appears to be a general colloidal theory that an electrolyte (such as $Ca^{2+}$) destabilizes a colloidal system (such as CSD), the present invention is therefore believed to provide a surprising accomplishment by obtaining a stable blend by combining CSD with a partially calcium-saponified TOFA emulsion.

The saponification step in the present invention generally is carried out by mixing the desired quantity of the TOFA and lime. Preferably, $Ca(OH)_2$ powder is introduced slowly into the TOFA with stirring. Initially, the mixture is turbid, but eventually clears up with the completion of the reaction. The rate of reaction may be sped up by heat, slower addition of lime, the use of a finer grade of lime, and/or more vigorous mixing. Ambient temperatures were preferred for carrying out the reaction because of energy savings and ease of scale-up. In the practice of the invention, the TOFA is reacted with sufficient calcium hydroxide to saponify 5 to 90% of the TOFA based on the saponification value of the TOFA. The amount of calcium hydroxide needed can be calculated from the saponification value of the TOFA. The saponification value, commonly used by the soap industry, refers to the number of milligrams of potassium hydroxide needed to completely react with the fatty acid present in one gram of substance, in this case, TOFA.

Preferably, the TOFA is reacted with enough calcium hydroxide to saponify 10 to 50% by total weight of the TOFA, and more preferably with enough calcium hydroxide to saponify 15 to 35% by weight of the TOFA.

Any emulsifier which is capable of dispersing the water-repelling component in the aqueous phase of the emulsion and which does not have a deleterious effect upon the stability of the final blend composition can be used. Emulsifiers disclosed by U.S. Pat. No. 3,865,601 may be used as the emulsifier agent. These include esters of fatty alcohols, such as sulfate, for example ammonium sulfate esters thereof; aromatic sulfonates such as ammonium, alkali and alkaline earth metal aromatic sulfonates; saponified phenols or naphthenic acids, etc.

Emulsifiers of the anionic or nonionic type may be used such as liquids or solids selected from the group of alkaryl polyoxylalkylene alkanols and derivatives thereof, such as esters thereof (e.g., ammonium sulfate ester); and polyoxyethylene derivatives of hexitol anhydride partial long chain fatty esters. Mixtures of any of the foregoing may be used. In general, the emulsifier is employed in an amount of at least about 0.5% by weight of the solids.

A salt of a fatty or rosin acid, or combination thereof, particularly an alkali metal salt of such acid (See e.g., U.S. Pat. No. 3,865,601) may be used as the emulsifying agent. The emulsifier may also be prepared in situ by adding a base such as sodium hydroxide to the water-repellent component to produce the salt. In this embodiment, the base is added in an amount that is sufficient to produce the emulsifier to create the emulsion. Generally, the amount of added base will be about 0.10% to 2.0%, and preferably about 0.5% total solids.

It should be noted that the use of a salt of a fatty acid, rosin acid, or combination thereof as the emulsifier agent alone, without the aforementioned $Ca(OH)_2$ pretreatment, is ineffective to produce a stable TOFA/CSD blend. This observation is believed to be true regardless of whether one uses "in-situ" base treatment or not. In other exemplary embodiments, the partially calcium saponified TOFA is preferably homogenized, such as by using a sonicator or industrial homogenizer, which is believed to improve the stability of the TOFA/CSD blend formed therefrom.

Further exemplary compositions and methods for saponifying the TOFA are described below. In another exemplary method comprises the step of adding calcium hydroxide to the water used for emulsifying the TOFA, then subsequently emulsifying the TOFA. Another method involves the step of adding calcium hydroxide to the TOFA Emulsion 2 (See FIG. 3) after the emulsion is formed. Both methods significantly improve the stability of the TOFA/CSD blend. However, pre-reacting calcium hydroxide with TOFA (as shown in FIG. 3) is the most preferred method. The pre-reacting is believed to achieve saponification most completely such that relatively little of the calcium hydroxide remains unreacted with the TOFA.

An advantage of the emulsion approach is that the ratio of CSD and TOFA may be varied freely to tailor the final desired properties of the blend. For example, in concrete block additives, a larger amount of CSD may be used in the blend to make the block water repellant and to prevent secondary efflorescence.

For concrete pavers (e.g., used for sidewalks or pavement), primary efflorescence is of greater concern. The paver additives may therefore contain a higher percentage of TOFA. The quantity of active ingredients (other than water) in the final blend generally ranges from 25 to 65 percent, and preferably from about 40 to 50 percent, by total weight. Known preservatives may be used in the present invention to prevent spoilage, and from about 0.1 to 1.0 percent (wt) of preservative is generally found to be effective.

Figure 4:
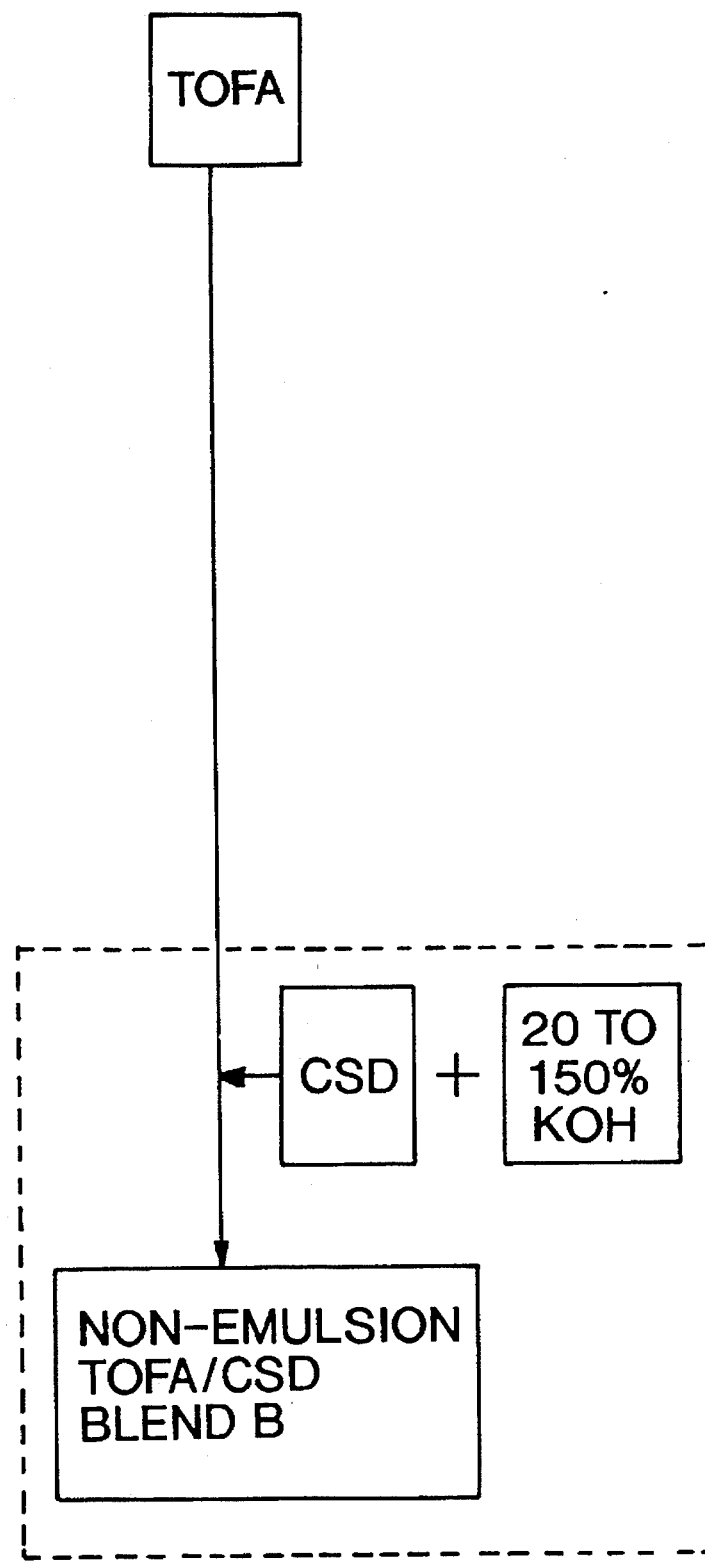
FIGS. 4 and 5 are illustrations of exemplary methods of the present invention for making a non-emulsion TOFA/CSD blend.
Figure 5:
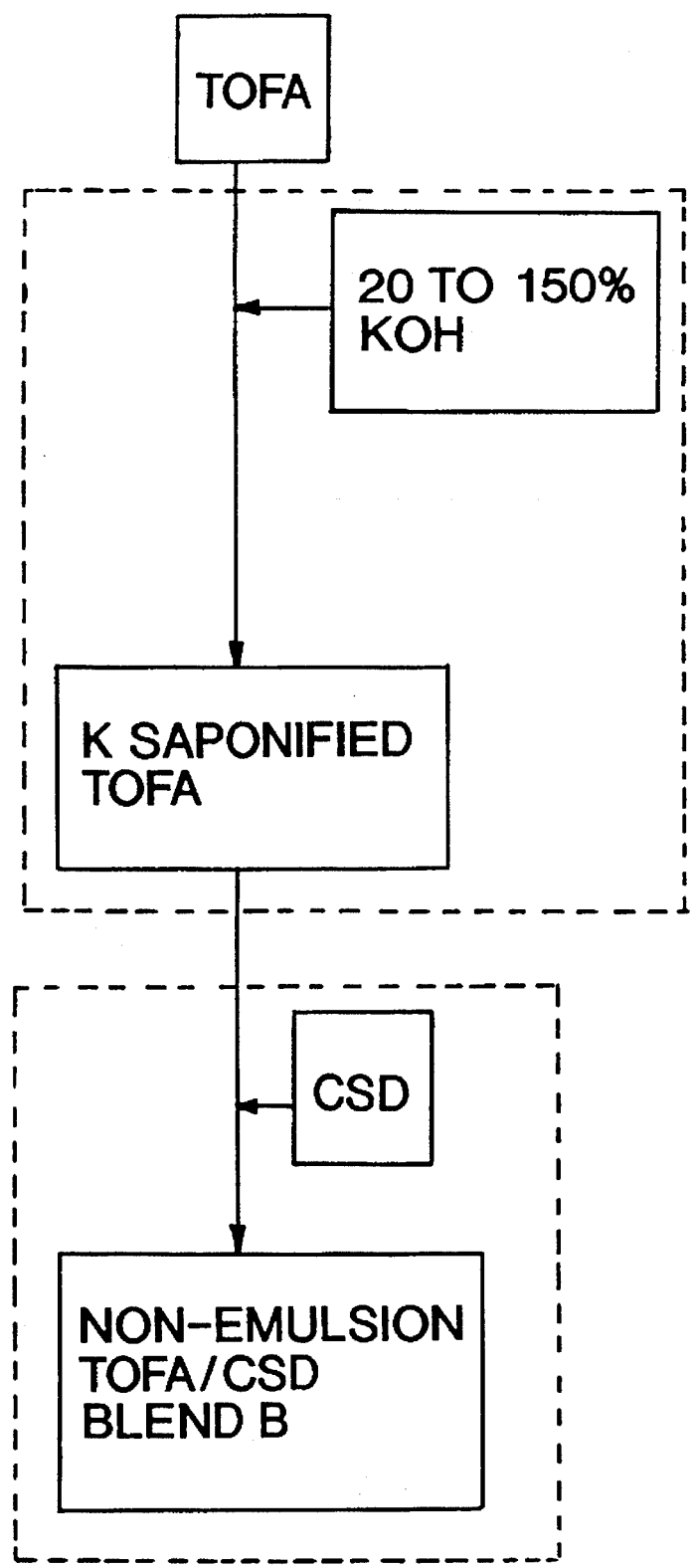

FIGS. 4 and 5 illustrate another exemplary approach wherein potassium hydroxide is used to obtain a stable TOFA/CSD nonemulsion blend. By avoiding an emulsification step, the exemplary approach is simpler and provides cost savings due to the elimination of emulsification equipment (e.g., high shear mixer/homogenizer) and emulsifier.

However, the blend obtained is limited to a 20:80 ratio of TOFA to CSD because the solubility of potassium saponified TOFA is about 20%. Moreover, the potassium saponified blend is believed to be less stable than that of the emulsion-based process using calcium hydroxide, as described above, because the stability of the non-emulsion blend may vary from a few weeks to a few months (at ambient temperature). Stability depends on pH, the total solids within the blend, the purity and composition of the TOFA, as well as the storage temperature of the blend.

FIG. 4 illustrates the more preferred of the two non-emulsion approaches. As shown in FIG. 4, potassium hydroxide is mixed first with the CSD, and then this mixture is combined with the TOFA to obtain "Blend B." The amount of potassium hydroxide used should be 20 to 150% of the saponification value of the TOFA. More preferably, the amount of potassium hydroxide should be about 60 to 120%, and most preferably about 75 to 90%, of the TOFA saponification value. Generally, the pH of the TOFA/CSD blend (Blend B) should be 7.5–13.0, more preferably 8.0–12.5, and most preferably 8.5–10.0. Total solids of Blend B should generally be about 20–50% total wt., and more preferably 35–45%. FIG. 5 illustrates an alternative method in which the TOFA is first saponified by adding potassium hydroxide, and the CSD is subsequently added to obtain the non-emulsion TOFA/CSD blend (Blend B).

The invention also provides further exemplary paver admixtures wherein the TOFA/CSD blends, either Blend A or Blend B as discussed above, further comprises an admixture for modifying one or more properties of the concrete. The TOFA/CSD blend is considered a "base stock" which may further comprise, for example, known set retarding agents (otherwise referred to as "retarders"), such as lignosulfonate salts, polysaccharides, hydroxyl carboxylic acids, or mixtures thereof (See e.g., U.S. Pat. No. 3,865,601, incorporated herein by reference).

Alternatively, the base stock may comprise other admixtures such as anionic or nonionic surfactants. Generally, the base stock blend which includes the additional admixture or admixtures should preferably comprise 25–65%, and more preferably 40–50%, of total weight solids. A preferred set retarder is corn syrup because it does not tend to destabilize the TOFA/CSD blend. Sucrose and sodium gluconate are also preferred retarders.

For example, an exemplary blend of the invention preferably contains 50–95% wt. (total solids) of the TOFA/CSD base stock; 3–35% wt. corn syrup (retarder); and 1–15% additional surfactants. More preferably, the blend can contain: TOFA/CSD base stock (65–90%); corn syrup (5–25%); and additional surfactants (2–10%).

Generally, retarders are water-soluble. Therefore, they can be added with water or other aqueous materials. Surfactants can be added in the usual mode.

The following examples are provided for illustrative purposes only, and are not intended to limit the invention.

EXAMPLE 1

This example illustrates the stability problem of the TOFA/CSD blend which the present invention overcomes.

The following blends were prepared by mixing various amounts of the TOFA (tall oil fatty acid) and CSD (calcium stearate dispersion) in a glass jar. The mixtures are tabulated below:

TABLE 1

| Sample No. | TOFA (gms) | CSD (gms) | TOFA:CSD |
|---|---|---|---|
| 1 | 25 | 100 | 33:67 |
| 2 | 50 | 100 | 50:50 |
| 3 | 100 | 100 | 67:33 |
| 4 | 200 | 100 | 80:20 |

The weight of the TOFA and CSD are provided above in grams. The ratio of TOFA and CSD is provided in the fourth column ("TOFA: CSD"). TOFA is commercially available from Arizona Chemical Co., Panama City, Fla., under the tradename ACTINOL® (grade FA-2). The CSD (DARAPEL® from W. R. Grace & Co.-Conn.) contained 50% active solids.

With vigorous mixing, samples 1 and 2 turned into paste. Within 10 minutes, both samples 1 and 2 developed a consistency similar to cold cream, rendering them useless as an admixture. With higher TOFA content (i.e. 67%), sample 3 had an initial viscosity of 1250 cps (as measured by a Brookfield viscometer with spindle No. 3 at 60 rpm). Upon standing, the viscosity increased to 2500 cps within 30 minutes. The mixture developed a cold cream consistency within 24 hours. Within a week, it solidified into a butter consistency. Although sample 4 had the lowest initial viscosity (950 cps), its behavior was similar to sample 3, and turned into a butter consistency within 10 days.

EXAMPLE 2

This example illustrates a preferred embodiment of the invention in which a partially calcium-saponified TOFA is prepared as a TOFA/CSD "base stock" blend.

Partially (30%) calcium-saponified TOFA was prepared as follows. The saponification value (or acid number) of the TOFA used (Actinol® FA-2) is 196.

The amount of $Ca(OH)_2$ required to saponify 100 grams of TOFA was calculated to be 3.88 grams as follows:

| 100 gm × 0.196 × | (M.W. Ca(OH)$_2$ | /(M.W. KOH) | /valence of Ca | × 30% = |
| 100 gm × 0.196 × | 74.19 | /56.1 | /2 | × 30% = |
| 3.88 gm | | | | |

Thus, 3.88 grams of Ca(OH)$_2$ powder (reagent grade) was added slowly into 100 grams TOFA liquid with stirring. The powder slowly dissolved after 2 hours of mixing, resulting in a lightly yellow solution (labelled as "p-Ca-TOFA").

A partially (30%) calcium saponified TOFA emulsion was prepared as follows: 4 grams of 50% Tergitol NP-70 (available from Union Carbide Co., Danbury, Conn. as 70% viscous solution, and diluted to 50 prior to use) is mixed with 56 grams of deionized water. To this solution 41 grams of p-Ca-TOFA is added dropwise over a period of 5 minutes with stirring. The resulting mixture has 40% active ingredients. The resulting milky suspension was then homogenized with a sonicator (Model VC600, available from Sonics & Materals. Inc., Danbury, Conn.) for 2 minutes. The homogenization was carried out to reduce the emulsion particle size and also to narrow the particle size distribution. The mean particle size of the resulting emulsion (labelled as "TOFA Emulsion 2") was measured with a particle size analyzer (MasterSizer, Model 1002, Malvern Instruments, Malvern, England), and found to be 0.64 microns. The emulsion, made without homogenization, had a particle size of several microns, and separated into layers upon standing.

TOFA/CSD blends were then prepared as follows. 40% CSD was prepared by diluting 50% CSD stock with dionized water. The diluted CSD was added slowly into the above-described TOFA Emulsion 2 with stirring. Three blends were prepared by varying the TOFA:CSD ratio, as shown in Table 2 below:

TABLE 2

| Sample No. | TOFA:CSD |
| --- | --- |
| 5 | 20:80 |
| 6 | 50:50 |
| 7 | 75:25 |

For comparison, samples 8 and 9 were prepared in a similar manner, except using a non-saponified TOFA emulsion. In other words, these 2 blends were prepared by omitting the calcium saponification step. These comparison samples 8 and 9 were made by mixing and homogenizing the emulsifier, water, and "straight TOFA," and then CSD was blended in.

The stability of the TOFA/CSD blends was then tested. Each of the samples 5 through 9 were divided into two portions. One portion was used to determine the stability when the blends were stored at ambient temperature. The other portion was used for a stability test when the blends were stored in a 120° F. oven. The higher temperature testing was designed for two purposes. The 120° F. temperature was chosen to simulate the worst storage conditions, namely, the storage of blends in hot weather regions. The 120° F. test is also designed as an accelerated test to gauge the stability of blends within limited test times.

Stability was measured in terms of the number of days elapsing before any significant physical changes were noted in the blends. The types of changes include viscosity, color, creaming, and oil/water separation. Results of the stability testing of samples 5 through 9 are listed in Table 3.

TABLE 3

| Sample No. | TOFA type | TOFA:CSD (ratio) | Stability (Days) ambient | 120° F. |
| --- | --- | --- | --- | --- |
| 5 | p-Ca-TOFA | 20:80 | >225 | >225 |
| 6 | p-Ca-TOFA | 50:50 | >225 | >225 |
| 7 | p-Ca-TOFA | 75:25 | >225 | 133 |
| 8 | TOFA | 20:80 | 1 | not measured |
| 9 | TOFA | 50:50 | 3 | not measured |

As shown above, samples 5, 6, and 7 evidenced a stability at ambient temperature of more than 7 months (210 days) while samples 8 and 9 showed stability at ambient temperature of less than 1 week. This stability data clearly indicates that the partially calcium saponification TOFA (p-Ca-TOFA) method drastically increased stability of the TOFA/CSD blend.

EXAMPLE 3

This example describes another preferred embodiment of the invention wherein a potassium hydroxide saponification method is used to prepare a non-emulsion TOFA/CSD blend. A 2,000 gram batch, containing 40% by weight active solids (TOFA and CSD solids), was prepared as follows:

In a 3 liter container, 1,290 grams of 50% CSD and 494 grams of water were mixed. To this dispersion, 55.8 grams of a 45% KOH solution was added dropwise. The amount of KOH added was calculated to be sufficient to saponify 80% of the TOFA based on the saponification value of TOFA. The pH of this mixture was 13.4. Finally, 160 grams of TOFA was added to the above mixture slowly (dropwise). The pH of this TOFA/CSD blend was 8.9. The Brookfield viscosity was 630 cps. The shelf life of this blend exceeded 7 months at ambient temperature.

EXAMPLE 4

The following example illustrates the incorporation of another additive, such as a retarder or other suffactants, to the TOFA/CSD base stock to modify particular properties of concrete products such as CMUs.

The TOFA is partially (20%) saponified in a manner similar to that of Example 2. Then, the following admixtures were prepared containing the following ingredients in the proportions shown in Table 3.

TABLE 3

| Sample No. | p-Ca-TOFA | CSD | Nonionic Surfactant[a] | Anionic Surfactant[b] | Retarder[c] | Water |
| --- | --- | --- | --- | --- | --- | --- |
| 10 | 44.2 | 33.6 | 10.5 | 4.0 | 7.7 | 150 |
| 11 | 60.3 | 18.7 | 5.9 | 2.2 | 12.9 | 150 |
| 12 | 70.6 | 7.9 | 2.5 | 2.8 | 16.3 | 150 |
| 13 | 39.2 | 29.8 | 9.3 | 1.2 | 20.5 | 150 |

TABLE 3-continued

| Sample No. | p-Ca-TOFA | CSD | Nonionic Surfactant[a] | Anionic Surfactant[b] | Retarder[c] | Water |
|---|---|---|---|---|---|---|

Legend: Surfactant[a] is Surfonic® N95, Texaco Chemical Co., Houston, Texas. Surfactant[b] is Sodium dodecylbenzene sulfonate. Retarder[c] is corn syrup All four admixture samples contained 40 by weight of active ingredients (other than water). All showed a good shelf life of at least 6 months when stored at ambient temperature. Each sample was incorporated into the concrete mix in a typical manner.

The concrete mix consisted of: 850 parts sand, 350 parts coarse aggregate, 230 parts Type 1 Portland cement, and 2.5 parts black iron oxide pigment, with an adequate amount of water added to form a nonplastic mix. The aggregates used met the ASTM C 33 requirements. The admixture was added at a dosage rate of about 13 ounces per 100 pounds of cement. The admixture was added to the concrete mix immediately after the start of the addition of water (See Background of the Invention, supra). The admixture-containing "nonplastic" mix was then fed into the mold of a paver machine, and concrete pavers (dimensions: 7¼×3⅞× 2¼") were formed.

During the curing stage of the paver, no primary efflorescence on the pavers was observed where the admixtures were used. This indicated that the TOFA in the admixture was effective in controlling primary efflorescence. The water absorption was then determined by ASTM C 140-91, and found to be less than 3.5% on the admixture-containing pavers. The low water absorption indicated that the CSD in the admixture operated in controlling water migration in the paver, and minimized secondary efflorescence.

All pavers had nice smooth surface texture with sharp corners and edges. Neither cracking nor crazing was noted on the pavers. All these observations indicated that the surfactants in the admixtures had served their intended functions of improving the plasticity and workability of the concrete mix.

The compressive strength of pavers were determined by ASTM C 140-91, The results are shown in Table 4.

TABLE 4

| Sample No. | Proportion Of Retarder | Compressive Strength (psi) |
|---|---|---|
| 10 | 7.9 | 9720 |
| 11 | 12.9 | 9980 |
| 12 | 16.3 | 10290 |
| 13 | 20.5 | 11180 |

The results shown in Table 4 above indicate that incorporation of increasing amounts of the retarder into the admixture increases the compressive strength of the pavers, due to the retardation of the cement hydration.

The foregoing examples are provided for illustrative purposes only. While preferred embodiments of the invention have been described herein, other variations and modifications may be practiced by those skilled in the art without departing from the spirit and scope of the present invention.

We claim:

1. A composition for decreasing efflorescence in concrete, said composition comprising a single admixture blend operative to reduce primary and secondary efflorescence in concrete, said blend comprising a liquid water-insoluble oil selected from the group consisting of a fatty acid and a rosin acid and a dispersion comprising an aqueous suspension of solid particles of calcium stearate.

2. The composition of claim 1 wherein said blend comprises an emulsion, and said liquid water-insoluble oil is reacted with sufficient calcium hydroxide to saponify 5 to 95% of said liquid water-insoluble oil based on the saponification value of said liquid water-insoluble oil.

3. The composition of claim 2 wherein said liquid water-insoluble oil comprises tall oil fatty acid.

4. The composition of claim 2 wherein said liquid water-insoluble oil comprises a fatty acid that comprises oleic and linoleic acid.

5. The composition of claim 1 wherein said blend is formed by a method comprising the steps of mixing together potassium hydroxide and a dispersion comprising an aqueous suspension of solid particles of calcium stearate; and subsequently blending said mixture of potassium hydroxide and said calcium stearate dispersion with said liquid water-insoluble acid.

6. The composition of claim 1 wherein said blend is formed by method comprising the steps of combining said liquid water-insoluble oil and potassium hydroxide, and subsequently combining said water-insoluble oil and potassium hydroxide mixture with a dispersion comprising an aqueous suspension of solid particles of calcium stearate, whereby a blend is obtained.

7. The composition of claim 1 further comprising an admixture selected from the group consisting of retarders and surfactants.

8. The composition of claim 7 comprising a retarder selected from the group consisting of corn syrup, sucrose, and sodium gluconate.

9. The composition of claim 1 wherein said blend has a shelf life at ambient temperature of at least three months.

10. The composition of claim 2 wherein said water-insoluble oil and calcium hydroxide are homogenized prior to said step of combining said calcium stearate dispersion to from said single blend.

11. A method for formulating a single blend concrete admixture composition comprising the steps of:
   providing a liquid water-insoluble oil selected from the group consisting of fatty acid and rosin acid;
   saponifying said liquid water-insoluble oil; and
   combining said saponified liquid water-insoluble oil with a dispersion comprising an aqueous suspension of solid particles of calcium stearate, whereby a single blend is obtained.

12. The method of claim 11 wherein said liquid water-insoluble oil comprises tall oil fatty acid, and wherein said step of saponifying said liquid water-insoluble oil further comprises partially saponifying said liquid water-insoluble oil with calcium hydroxide in an amount sufficient to saponify 5 to 90 of said liquid water-insoluble oil based on the saponification value of said acid component, and said step of combining said tall oil fatty acid with said calcium stearate dispersion occurs after said partial saponification of said tall oil fatty acid, and said obtained single blend comprises an emulsion.

13. The method of claim 12 wherein said calcium hydroxide is added to said tall oil fatty acid in an amount sufficient to saponify 15–35% by weight of said tall oil fatty acid.

14. The method of claim 11 wherein said liquid water-insoluble oil comprises tall oil fattty acid, and said method further comprises the step of combining potassium hydroxide with said dispersion comprising an aqueous suspension of solid particles of calcium stearate, and subsequently combining said potassium hydroxide and said calcium stearate dispersion with said tall oil fatty acid, whereby a single blend is obtained.

15. The method of claim 11 wherein said liquid water-insoluble oil comprises tall oil fatty acid, and said saponification step comprises the step of introducing potassium hydroxide into said tall oil fatty acid.

16. A method for controlling efflorescence in concrete, comprising the steps of: introducing into concrete a single blend comprising a liquid water-insoluble oil and a dispersion comprising an aqueous suspension of solid particles of calcium stearate, wherein said water-insoluble oil is at least partially saponified prior to addition of calcium stearate.

17. The method of claim 16 wherein said single blend comprises an emulsion of tall oil fatty acid and a dispersion comprising an aqueous suspension of solid particles of calcium stearate, said tall oil fatty acid being partially saponified with calcium hydroxide and emulsified, said calcium stearate dispersion being combined with said tall oil fatty acid after said partial saponification and said emulsification.

18. The method of claim 16 wherein, in said step of introducing a single blend into concrete, said blend is formed by combining potassium hydroxide, tall oil fatty acid, and a dispersion comprising an aqueous suspension of solid particles of calcium stearate.

19. An admixture blend operative to reduce primary and secondary efflorescence in concrete when added as a single admixture into the concrete mixture, comprising (1) a liquid water-insoluble oil selected from the group consisting of a fatty acid and a rosin acid and (2) a dispersion comprising an aqueous suspension of solid particles of calcium stearate; said blend obtained by combining said water-insoluble oil and calcium hydroxide in an amount operative to saponify 5 to 90% of said oil based on the saponification value of said oil, said water-insoluble oil and calcium hydroxide being combined with each other prior to addition of calcium stearate, and, after said step of combining said liquid water-insoluble oil with said calcium hydroxide, combining said saponified oil with a dispersion comprising an aqueous suspension of solid particles of calcium stearate, whereby a blend is obtained.

* * * * *